US010154749B2

(12) United States Patent
Riefenstein

(10) Patent No.: US 10,154,749 B2
(45) Date of Patent: Dec. 18, 2018

(54) COOKING DEVICE AND PROCEDURE FOR COOKING FOOD

(75) Inventor: Lutz Riefenstein, Weilheim (DE)

(73) Assignee: CONVOTHERM ELEKTROGERAETE GMBH, Eglfing (DE)

( * ) Notice: Subject to any disclaimer, the term of this patent is extended or adjusted under 35 U.S.C. 154(b) by 1377 days.

(21) Appl. No.: 13/877,111

(22) PCT Filed: Nov. 14, 2011

(86) PCT No.: PCT/IB2011/003225

§ 371 (c)(1),
(2), (4) Date: Sep. 25, 2013

(87) PCT Pub. No.: WO2012/063135

PCT Pub. Date: May 18, 2012

(65) Prior Publication Data

US 2014/0026762 A1 Jan. 30, 2014

(30) Foreign Application Priority Data

Nov. 12, 2010 (DE) ........................ 10 2010 051 073

(51) Int. Cl.
*A47J 27/62* (2006.01)
*F24C 7/08* (2006.01)
*H05B 6/64* (2006.01)

(52) U.S. Cl.
CPC ............... *A47J 27/62* (2013.01); *F24C 7/085* (2013.01); *H05B 6/6441* (2013.01); *F24C 7/08* (2013.01)

(58) Field of Classification Search
CPC .. A47J 27/62; F24C 7/08; F24C 7/085; G05D 23/1927; G05D 23/1931
(Continued)

(56) References Cited

U.S. PATENT DOCUMENTS 5,504,311 A * 4/1996 DuBuis ................ H05B 6/6438 219/506
6,774,345 B1 8/2004 Kenk
(Continued)

FOREIGN PATENT DOCUMENTS

DE 102005040206 A1 2/2007
DE 102008031378 A1 1/2009
(Continued)

*Primary Examiner* — Reginald L Alexander
(74) *Attorney, Agent, or Firm* — Ohlandt, Greeley, Ruggiero & Perle, LLP

(57) ABSTRACT

Disclosed is a cooking device with optical identification means for identifying food to be cooked. A motion detector is provided to activate the optical identification means. The motion detector may also activate a light source for lighting the field of vision of the optical means. Optical identification is controlled by the outer appearance of the food. A controller accesses a physical feature database and compares previously stored picture data to the physical features of the food to be cooked. The controller calculates a matching probability rank between the stored picture data and the food to be cooked. The controller is also programmed to have a learning ability for recognizing a previously unknown food product. Based upon the identification of the food product to be cooked, the cooking device starts the recipe for cooking the food product.

16 Claims, 2 Drawing Sheets

(58) Field of Classification Search
USPC .................. 99/325, 326, 331, 334, 341, 468
See application file for complete search history.

(56) References Cited

U.S. PATENT DOCUMENTS

| | | | | |
|---|---|---|---|---|
| 8,344,294 | B2 * | 1/2013 | Greiner | F24C 7/08 219/492 |
| 8,563,059 | B2 * | 10/2013 | Luckhardt | F24C 7/08 426/233 |
| 2002/0026325 | A1 | 2/2002 | Hirahara et al. | |
| 2007/0007279 | A1 | 1/2007 | Chun et al. | |
| 2007/0288192 | A1 * | 12/2007 | Imgram | A23L 5/15 702/132 |
| 2010/0199854 | A1 * | 8/2010 | Homme | F24C 14/00 99/325 |
| 2011/0177222 | A1 * | 7/2011 | Calzada | A47J 37/0611 426/523 |

FOREIGN PATENT DOCUMENTS

| | | | |
|---|---|---|---|
| EP | 1193584 | A1 | 4/2002 |
| WO | 200049838 | A1 | 8/2000 |

* cited by examiner

COOKING DEVICE AND PROCEDURE FOR COOKING FOOD

CROSS-REFERENCE TO RELATED APPLICATION

This application claims priority to PCT application PCT/IB2011/003225, filed Nov. 14, 2011, and to German patent application DE 10 2010 051 073.4, filed Nov. 11, 2010, both of which are incorporated herein as if set forth herein in their entirety.

BACKGROUND

Field of the Disclosure

The present disclosure is related to a cooking device, and to a procedure for cooking food that uses food product recognition prior to cooking the food product to determine a cooking cycle for cooking the food and present that cooking cycle to an operator or initiate cooking on its own. The food product recognition of the present disclosure is based upon the physical features/appearance of the food to be cooked.

Discussion of the Background Art

In the state of art, it is well-known to cook food with commercial devices, especially with a combi-steamer or with a baking oven. In the state of the art, identification of the food to be cooked is also well-known.

EP 1 193 584 A1 discloses a microwave cooking device with an RFID sensor. The RFID sensor automatically identifies the food to be cooked via an RFID tag which is attached to the packaging of the food to be cooked. The cooking process can then run automatically.

WO 00/49838 A1 discloses a cooking device with a scanner. The scanner identifies a code or a symbol on the food packaging, whereupon an integrated microprocessor accesses a cooking recipe from data stored on a database.

U.S. Pat. No. 6,774,345 shows a cooking device with a bar code reader which is located at a front side of the cooking device. The bar code reader identifies the food by reading a bar code from the packaging of the food. After that, the cooking device permits or denies the cooking of the food.

U.S. Pat. Pub. 2007/0007279 discloses a cooking device that reads bar codes from packaging of the food to be cooked. The cooking device can be connected to an ID infrastructure in order to download further data for the food or for the cooking recipe.

DE 10 2005 040 206 A1 discloses a cooking device system and a procedure for cooking food, wherein an identifier for the food is provided. The identifier can have the form of a bar code reader or of an RFID sensor. Data for the food or for the cooking recipe can be accessed over the internet or from a local database.

U.S. Pat. Pub. 2002/0026325 discloses controlling a cooking procedure with data from a local network and from the internet. RFID tags are used for identifying the food to be cooked.

DE 10 2008 031 378 A1 discloses a cooking device with a recognition system for the food with the recognition occurring via RFID tags, and with an automatic recognition of the tray rail in which the food to be cooked has been inserted.

SUMMARY

It is an object of the present disclosure to provide a commercial cooking device with simplified methods of use for the identification of food to be cooked.

It is also an object of the present disclosure to provide a commercial cooking device that eliminates erroneous identification of food to be cooked such as is possible in the case of mislabeled food which is a possibility of the above prior art.

According to a first embodiment of the present disclosure, this goal is achieved by a cooking device for commercial use, especially a combi-steamer or a baking oven or a microwave oven, having a digital optical identification means for the food product to be cooked within the cooking device. The digital optical recognition means may provide a cooking recipe to the user of the cooking device and, alternatively, may start the cooking recipe automatically. The digital optical recognition means includes picture taking means, stored data of previously presented food to be cooked, and a controller which may, inter alia, access and analyze the pictures obtained by the picture taking means and compare those pictures, preferably in digital format, to previously obtained date relating to food to be cooked. Additional embodiments include the digital optical recognition means recognizing the placement of the food to be cooked in the cooking device, as well as adjustment of any selected recipe due to an already running cooking recipe in the cooking device.

In an additional embodiment, the digital optical recognition means has a learning function whereby identification and cooking recipes for food to be cooked which previously have not been stored in the data base may be learned and added to the data base.

In another embodiment of the present disclosure, there is provided a process for cooking food with a cooking device for commercial use comprising: approaching the cooking device with food to be cooked; moving the food to be cooked through a picture taking means' field of vision; collecting data of the food to be cooked by the picture taking means; analyzing the data collected to identify the food to be cooked; optionally, inspecting whether an output concerning the amount, number or kind of food identified by the cooking device correctly corresponds with the amount, number or kind of food to be cooked; providing or selecting a cooking recipe for the food to be cooked; and, optionally, automatically starting the provided or selected cooking recipe.

In another embodiment of the present disclosure, there is provided a cooking device which performs the steps of recognizing the food to be cooked is near the cooking device; capturing images of the recognized food to be cooked; analyzing the captured images to identify the food to be cooked; selecting a cooking recipe for the identified food to be cooked; and presenting the selected cooking recipe on a display. In preferred embodiments, the cooking device performs further steps including one or more of the following: setting the cooking device to perform the selected cooking recipe, adjusting the cooking recipe depending upon the temperature condition of the cooking chamber of the cooking device and automatically starting the cooking recipe when the food to be cooked is place in the cooking device.

In the context of the present disclosure, a "combi-steamer" means a commercial kitchen cooking device for cooking with hot air, steam or superheated steam. In general, a combi-steamer comprises at least a cooking chamber, a door enclosing the cooking chamber, a steam generating system, a fan, a heating element for heating the cooking chamber, and an electronic controller with a user interface.

Also in the context of the present disclosure, a "digital optical identification means" includes optics for product recognition on one hand, and includes electronic evaluation of the product recognition made by the optics on the other hand, so that the food product identification data can be further processed.

The present disclosure provides "identification means for the food to be cooked". In other words, the optical identification is managed and determined by the outer appearance of the food itself. Any state of the art in which optical recognition means are provided, but not identifying the food itself by its outer appearance (for example, by taking a picture of a symbol plate, an RFID tag or a bar code, etc.) is not meant to be within the scope of the wording "identification means for the food to be cooked". Although optical recognition and identification procedure for identification of food to be cooked by the prior art systems and methods may produce wrong data or identification on occasion, it is possible to reduce or eliminate the error by the systems and methods of the present disclosure. For example, it will not be a source of error that the operating personnel placed an incorrect identification tag onto the food to be cooked. Rather, the cooking device of the present disclosure uses first-hand real time information concerning the type of food, the amount of food, the state of the food, etc., to identify the food to be cooked

BRIEF DESCRIPTION OF THE DRAWINGS

Further advantageous features and details of the present disclosure will become apparent to those of skill in the art from the following description of the drawings, in which.

DETAILED DESCRIPTION OF THE DISCLOSURE

Figure 1:
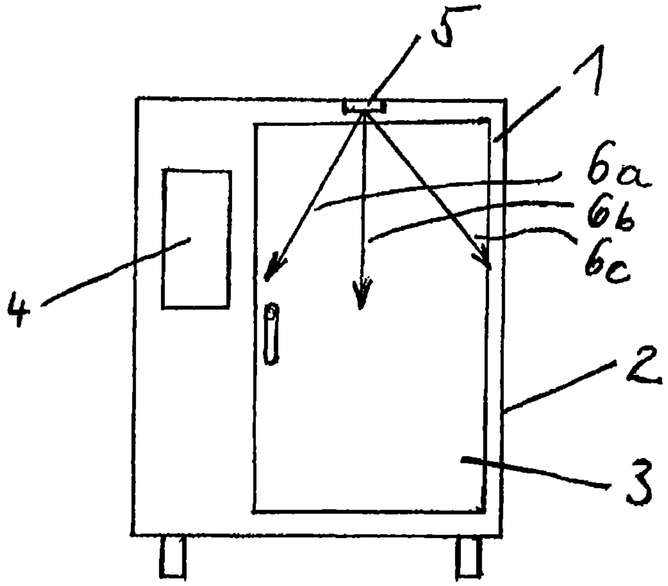
FIG. 1 shows a front view of a cooking device in schematic form in which a camera is placed centrally over the door leading to the cooking chamber.
Figure 2:
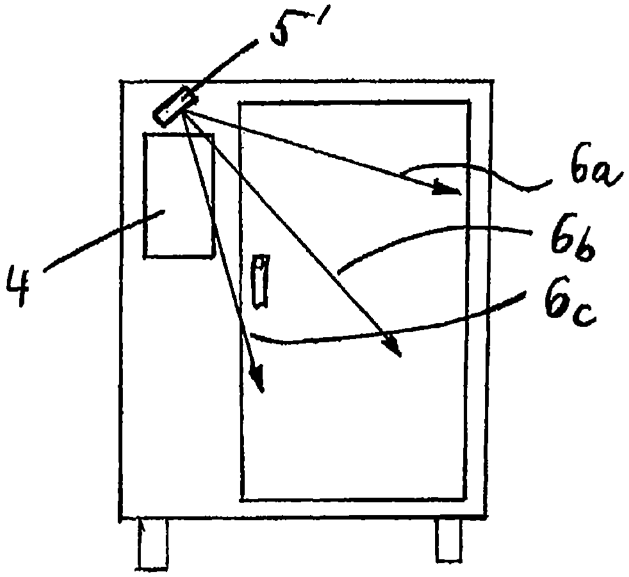
FIG. 2 shows a second embodiment of the cooking device of FIG. 1 in which the camera is positioned at a top left corner of the front side of the cooking device and orientated at an angle towards the door leading to the cooking chamber.
Figure 3:
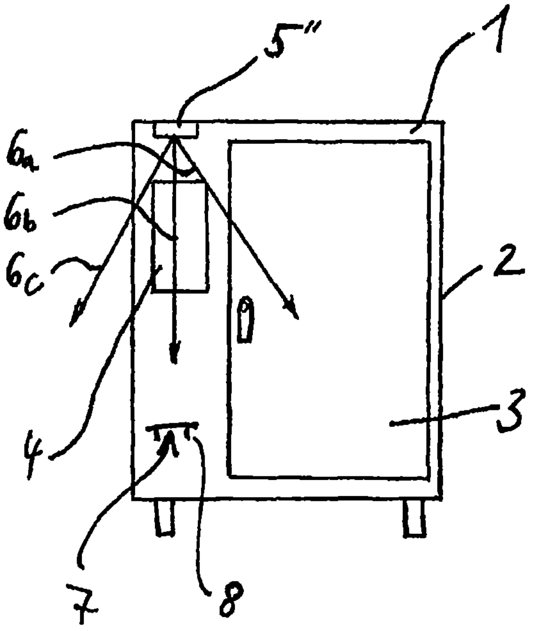
FIG. 3 shows a third embodiment of the cooking device of FIG. 1 in which the camera is placed in the top left corner of the front side of the cooking device and is oriented looking vertically downwards.

In the Figures, a commercial cooking device 1, for example a combi-steamer or a baking oven, generally includes cooking device housing 2 and door 3 for closing and opening, thereby providing access to a cooking chamber (covered by door 3 in the Figures). Command panel/user interface 4 is provided on a front side of the commercial cooking device 1, so that the commercial cooking device 1 can communicate with a user. Photo camera 5, 5', 5'', preferably digital, is provided at different locations of the front side of commercial cooking device 1 in order to capture pictures of food that is being inserted in to the cooking chamber when door 3 is opened. The data obtained by photo camera 5, 5', 5'' is stored in a temporary data stack memory element (not shown). The data is accessed by a controller (not shown). The controller evaluates the pictures and calculates data from the pictures with a digital photo filter and with pattern recognition algorithms.

Having gained the calculated data, the controller accesses a physical feature data base and compares the data that is stored in the physical feature data base with the calculated characteristic data. A software algorithm will first look for a maximum of identical characteristic data, and will—as an alternative—make up a bandwidth or access a predetermined bandwidth for reasonable variation for the data, and control how many of the characteristic data elements are within this bandwidth.

By following this procedure, the cooking device has a high probability of being able to identify as many features as possible of the food to be cooked which is being inserted into the cooking chamber. As a consequence, the system operates as a digital optical identification means for the food to be cooked.

Photo camera 5, 5', 5'' will capture still picture images or videos of any food that is positioned within the field of vision of photo camera 5, 5', 5'' in front of commercial cooking device 1. Photo camera 5, 5', 5'' has a fixed orientation, whereby the field of vision (shown as a two-dimensional capture area in the Figures, although in practice the field of vision is three-dimensional) is determined, with central axis 6*b*, and ranging between two maximum angular directions 6*a*, 6*c*. Centrally in the field of vision of photo camera 5'', there may be pedestal 7, installed on a front side of the cooking device, and laterally offset to door 3. The pedestal may be stabilized by cantilevers 8 in order to safely carry the weight of a tray edge positioned on pedestal 7 for as long as it takes a user to open or close door 3.

According to the present disclosure, the optical identification means comprises picture taking means for capturing one or more picture(s) of the food to be cooked, especially an electronic image sensor, such as a CCD sensor or a CMOS sensor. A "picture" in the context of the present disclosure may be a single picture, multiple pictures or a video film. The optical identification means may comprise a controller having access to picture data captured and stored of previous instances of the food. This means that a controller is provided as part of the optical identification means. The controller has access to a data base of picture data, i.e. to digital data which itself embodies the picture of the food or which is calculated from the picture taken of the food. If a digital picture taking means is provided, the picture data will be in digital format from the beginning. This is the easiest way for the data to be further processed. The picture data can be stored in data storage, or can be accessed directly by the controller. Also, it is possible to convert the data of the picture taken of the food in the first step into other forms of digital data. For example, colors can be calculated into shades of grey and digitized.

The controller is programmed to make use of the picture data. In addition to having access to picture data, the controller may have access to a physical feature data base, so that the controller can compare picture data to physical feature data of several food types, the physical features data being stored in the physical feature data base. In an arrangement such as this, the controller has two data sources; one source is concerned with the actual picture taken of the food to be cooked, while the other source is concerned with data of typical pictures, or with formerly taken pictures of several different food types, amounts, sizes, etc. By having access to two different data bases, the controller can compare the different data sets to one another. As a consequence, the controller can make a deduction as to whether the food of which a picture has just been taken corresponds to certain sets of data in the physical feature data base. The comparison may be based on picture data directly.

As an alternative or in an additional way of comparison, the comparison can be based on features deduced from the pictures. This can be done by, e.g., finding certain characteristic contours, colors, curvatures, sizes, proportions, numbers of food pieces, color contrasts, temperature grades, etc. of the food to be cooked.

For a physical feature identification of food to be cooked by comparing to significant data, the present disclosure provides for the physical feature data base to comprise data or data storage volume for at least one of the following features of the food: form, color, size, number, amount of curvature of the outline, surface area, center of area, structure, kind of packaging, geometry of a food cooking carrier, material, color, and structure of a food cooking carrier, and surface pattern of the food to be cooked, etc.

It should be emphasized that although the optical recognition and identification of the food to be cooked is primarily based on the outer appearance of the food itself, secondary criteria may also be used. For example, a good secondary criterion may be the food carrier. Food having the same shape may be better identified by, e.g., determining whether it is placed on, e.g., a grilling grid, a tray, or in a bowl.

The controller is preferably programmed to calculate a matching probability rank for a number of data sets in the physical feature data base. It will seldom be the case that picture data alone taken from food to be cooked will be absolutely identical to the data of former, prior food to be cooked which has previously been determined and stored in the physical feature data base. Thus, it will be necessary to actively make a decision for one of the products represented in the physical feature data base. A good way of making the decision will be to predicate it on the highest probability or likelihood of recognition of the food to be cooked. Therefore, the controller may go through a number of data sets, from a few to all, and calculate a matching probability for every one of the data sets. After that, one decisive number for every one of the data sets may be calculated by, e.g., adding the matching probabilities of all the individual features. The controller then may decide the most probable matched data set. As an alternative, the controller may give the user the most probable matched data sets for manual selection. Preferably, a series of pictures is taken by the picture taking means, so that the food identification means has more data to compare to the data coming from a picture taking means.

The controller is preferably programmed to have a learning ability for identifying food to be cooked. More particularly, the controller can be programmed to perform a learning function, with a user interface being able to initiate the learning function. In the learning function, a picture is taken and then stored as a known product entity with a name, and a cooking recipe is logically allocated to the now known product entity. In a preferred embodiment, during the learning function a video film is taken in order to generate a data basis for an arbitrarily high number of pictures or views of the food product. In a working example, a learning function can be as follows.

A user approaches the cooking device with food to be cooked that is not yet known to the physical feature data base. The optical identification means of the cooking device is activated and takes a picture of the food. The controller accesses the picture data taken of the food, compares the data to the physical feature data base, and issues a confirmation that the food is not yet known to the data base. Upon this, the cooking device emits a signal to the user indicating that an automatic cooking of this food is not possible. The user activates a button at the cooking device in order to ask the cooking device to create a new data set for this food product. Upon a request by the cooking device, the user holds the food into the picture capture area (or field of view) of the optics. The picture taking means takes a picture of the food, and the controller deduces certain features from the picture and stores them for later recognition of the same kind of food. Next, a dialogue is started with the user, and the user enters a name for the food. If possible at that time or, alternatively, later, the user adds a cooking recipe for this type of food. The cooking recipe—as well as typical physical features—is downloaded or real time-accessed from an external data base, preferably located in a network or accessed over the internet. The controller may be programmed to request the user to insert the food in different tray levels, and in different orientations. In all variations, the food to be cooked will look different from the picture taking means' position relative to the food. The controller may be programmed to have the picture taking means take pictures of several or of all different variations in order to gain more comparison data. A touchscreen may preferably be provided for giving signals to a user, and to receive commands and selections from the user during this and other processes.

In a preferred embodiment of the cooking device, the user can enter certain physical characteristics such as, e.g., temperature or weight, into the data base. In this manner, the controller will be able to identify food which is of the same type, but which is for example, of different temperature, piece number or size, more easily.

Once the picture, picture features, name, and corresponding cooking recipe for a certain food type are stored in the data base, the cooking device can always identify this food type, and can start the cooking recipe, or amend an already running cooking recipe, directly after loading. An amendment can especially be made in respect of the cooking time if an already running cooking recipe for another food has a slightly higher or lower cooking temperature than would normally be ideal for the newly-inserted product into the cooking device. The data gained in the learning mode can be electronically pushed to other cooking devices that are in the same cooking device data group, e.g. neighboring cooking devices in the same kitchen, or to cooking devices of the same company located remotely from the cooking device gathering the data. An alternative way for gaining new data is to load new data sets, preferably from the manufacturer of the cooking device. The manufacturer can create new data sets by testing publically available food, or even by testing special food. For example, a fast food chain company will have a certain product, either already on offer or to be newly introduced to the market. The fast food chain company can deliver food samples to the cooking device manufacturer, and the manufacturer will have a laboratory in which data sets can be created in the most accurate way possible.

The controller is preferably programmed to signal to a user, upon identification of food, the name of the food to be cooked that was identified. This is an easy way for the user to double check whether the food identification means, and therefore the cooking device, made a correct identification. The name can be shown in text on a display, can be pronounced by the controller using a loudspeaker, a picture of the food to be cooked can be shown, or several characteristic features can be listed on a screen. Most preferably, more than one way of signaling is used. Upon a failed identification attempt, the controller may be programmed to issue a warning signal to the user. Independently, the controller may be programmed to check upon the identification of a food to be cooked whether the current cooking chamber conditions are suitable for cooking that food and, if current cooking conditions are not suitable, to also issue a warning. This is especially so if the current cooking chamber conditions are outside of a certain range of conditions suitable for cooking the food to be cooked. The range suitable for cooking that food can be stored either in the physical feature data base or together with the cooking recipe for the food to be cooked in a cooking recipe database.

At the cooking device, a temperature sensor may be provided, preferably based on an infrared light measuring principle. Then, the cooking device can easily amend and adapt a stored cooking recipe for an estimated cooking time for food to be cooked starting in the condition of having a pre-existing temperature condition of the food. Further, a motion detector may be provided, with a means to activate the picture taking means, and to provide the controller with access to picture data captured of the food by the picture taking means. The motion sensor can preferably be a sensor for detecting a non-closed position of the cooking device door leading to the cooking chamber. Saving energy is always an important aspect for devices of all kinds, especially for cooking devices. This is not only true for the heating parts of the cooking device but also for the electronics. By providing a motion detector, the work of the electronics for taking pictures or a film of food to be cooked in the field of vision, and of the electronics to evaluate the optical data, can be initiated only after the motion detector signals that something is moving within the field of vision. Alternatively or additionally, the motion sensor can be provided electronically, by monitoring the incoming data from the picture taking means, e.g., a change of the pixels received by a digital camera can be recognized, and interpreted as motion. Independently, a motion detector may be provided with means to activate a light source for lighting a field of vision of the picture taking means. By activating a light source to light the field of vision, repeatable results can be achieved by the picture taking means. Thus, according to the present disclosure, the controller and picture taking means are provided, the controller comprising a means to activate a light source for lighting a field of vision of the picture taking means. The controller may be programmed to differentiate between movement of the food into or out of the cooking chamber. Such differential recognition will be simplified if numerous pictures are taken, especially if the opening of the cooking chamber is monitored—with discrete pictures or with a video film—over the time in which the cooking device door is opened. By way of pattern recognition, the controller will be able to determine whether food was being removed from the cooking chamber, or was being placed into the cooking chamber. In a cooking device as described above, a digital optical quality control means for food having been cooked within the cooking device may also be provided.

The light source can comprise an infrared light source, or can entirely consist of infrared light sources. Using an infrared light source avoids possible irritation for the personnel by visible light. If, for example, the picture taking means comprises optics with a prime lens, the prime lens will preferably have a small aperture so as to enable a high depth of field which, in turn, allows for having a longer exposure time, i.e. a slow shutter speed. This results in a longer time during which the light source needs to be activated. Using visible light would therefore possibly irritate the user. By using infrared light which is invisible to the user, more light can be emitted to the food without irritating the user.

Also according to the present disclosure, a recipe data base may be provided and arranged for being accessed by the controller after identification of the food to be cooked so that the controller can load information about cooking recipes for the identified food. This aspect was already explained above. If a high level grade of automation is desired, an automatic start function for a cooking recipe may be provided so that, upon closing the door of the cooking device, the cooking recipe is automatically started. In this case, a sensor is needed for detecting when the door is closed. Upon closing the door, the recipe data base can be accessed, and the cooking process be run according to the cooking recipe. If it is desired to have a semi-automatic start function, a start function for a cooking recipe may be provided upon actuating a cooking start command element, such as a three-dimensional button or a displayed command on a touch screen.

According to the present disclosure, the picture taking means may comprise a photo optics member. A photo optics is easy and inexpensive to provide, and provides for reliable quality with respect to taking pictures of the food to be cooked. The picture taking means may be located outside of the cooking chamber, preferably directly above or laterally above the door of the cooking chamber. From that vantage point, the picture taking means has a reliable view onto any food that is moved into the cooking chamber and/or out of the cooking chamber. Also, chances are high that any food placed on a tray will normally be oriented horizontal directly in front of a tray rack located in the cooking chamber of the cooking device. Therefore, this position for the picture taking means provides an ideal location for reliably gaining the best photographic angle towards the food. If the picture taking means is located at the cooking device door, it will also have a good view towards the inside of the cooking device itself, being able to view some distance into the inside of the cooking device when the door is opened. The picture taking means can also be mounted on an extendable and retractable holder, which extends when the cooking device door is opened and retracts when the cooking device door is closed. This is another way to gain a good angle of view of the inside of the cooking device toward the cooking chamber. In a more general aspect, the picture taking means may be mounted on moving means, so that pictures of the food to be cooked can be taken from two different angles. This makes it easier to gain more digital optical information about the food, thereby raising chances to correctly identify the food. Alternatively, the optics can comprise a prime lens. Prime lenses are provided with fixed focus length/aperture. Although this makes it more difficult to get a good picture of a food product that is not in the focal distance of the picture taking means, a prime lens does not have any optical influences coming from the lens itself, and is very reliable in gathering light with very little light loss. Therefore, a prime lens can provide for highly repeatable optical capture results. As an alternative, or in addition, a lens with a variable focal length can be used, preferably with an auto-focus system. In an alternative, the picture taking means or a controller accessing picture data comprises an optical filter. An "optical filter" can be a mechanical physical filter that is attached to the lens. On the other hand, the optical filter can be a digital filter that is laid upon a data captured of the food.

In addition to the picture taking means described above, a second picture taking means can be provided. Everything described above for the first picture taking means would also be of advantage and applicable to a second or for further picture taking means.

According to the present disclosure, it is advantageous if the picture taking means is located outside of an upward path of hot vapor escaping from the cooking chamber. When a cooking device door leading to the cooking chamber is opened, hot vapor contained in the cooking chamber will at least partially escape through the opened door. Being hot, the vapor escaping from the cooking chamber will take an upward path along a front side of the cooking device. Locating the picture taking means outside of this path will ensure that the picture taking means is not covered by condensing humidity. Another way to avoid condensation problems which can be used in addition to having the picture taking means located outside of the path of vapor escaping from the open cooking device is to heat the surface of the picture taking means. For improving the quality of vision towards the food, the picture taking means may comprise optics covered by a glass cover or, preferably, with a de-mister coating. In a preferred embodiment of the cooking device, an air blower is provided for directing an air stream towards or around the picture taking means, so that any unwanted vapor can be blown out of a picture taking means' field of vision. In an embodiment such as this, it is preferred to provide a blower activation means which activates the blower whenever the optical identification means operates a picture taking means.

The picture taking means may generally be oriented with a central capture area axis within a plane parallel to a front side of the cooking device, or with an angle versus that plane towards the front side—but preferably offset with a distance to a front side—of the cooking device. Every picture taking means will have a certain three-dimensional angle in which it is able to take pictures. In the present disclosure, this is referred to as the "capture area". Normally, a linear axis can be placed within this three-dimensional area, the axis being the center of the three-dimensional area. In the present disclosure, this is referred to as the "central capture area axis". When the central capture area axis is oriented within a plane parallel to the front side of the cooking device, the picture taking means will be oriented looking parallel to the front side of the cooking device. Having an angle versus that plane towards the front side enables the picture taking means to have an angle of view in which the picture taking means can look into the opening of the cooking device when the door is open and into the cooking chamber, at least in part.

Also according to the present disclosure, a food positioning area may be provided and marked on the front side of the cooking device, to which the field of vision picture taking means is directed. For example, an abutment, a recess, a carrier or the like may be provided on a front side of the cooking device laterally offset to the cooking device door. This positioning makes it easier for the user to understand where the food to be cooked should be placed in order to facilitate the optical recognition and identification. This way, a user wanting to insert a tray with food to be cooked into the cooking chamber will be provided a mechanical means to balance the tray on and, with only one hand remaining on the tray, the other hand becomes free in order to open the cooking device door.

According the present disclosure, there may also be provided a shelf rail marker, especially in a cooking chamber or at the shelf or rack itself, highlighting positions of shelf rails for the picture taking means. The shelf rail marker can, for example, be a strip-like element that is attached along the side of the cooking device opening or at the cooking chamber, or at the rack(s) located in the cooking chamber. There, the view toward the shelf rail marker will be easily kept from being obstructed from the line of view of the picture taking means. The shelf rail marker carries marked positions for the shelf rails. In this way, it is easier for the controller to evaluate the data from the picture taking means. This data can also and preferably be used in order to recognize on which shelf a tray with food to be cooked will be or has been inserted. The controller is preferably further programmed to perform an optical recognition of a tray level in which a tray is inserted. An alternative is to provide a mechanical tray detector in order to detect when a loading level is to be occupied by a tray holding food to be cooked.

The present disclosure having been thus described with particular reference to the preferred forms thereof, it will be obvious that various changes and modifications may be made therein without departing from the spirit and scope of the present disclosure as defined in the appended claims.

All of the patents and publications referred to herein are incorporated herein by reference as if fully set forth herein.

The invention claimed is:

1. A cooking device for commercial use comprising:
- a cooking chamber;
- a door for providing access to the cooking chamber;
- a digital optical identification means for identifying a food to be cooked within the cooking device, wherein the digital optical identification means comprises:
  - picture taking means, wherein the picture taking means captures images of the food to be cooked, and
  - a controller, wherein the controller performs the steps of:
    - accessing the captured images of the food to be cooked taken by the picture taking means;
    - accessing a data base of stored images of food to be cooked;
    - accessing a data base of recipes for food to be cooked;
    - comparing the captured images of the food to be cooked to stored images of food to be cooked;
    - identifying the food to be cooked based upon the comparison;
    - loading a cooking recipe for the identified food to be cooked into the cooking device; and
    - signaling that the food to be cooked has been identified; and
- a motion detector, wherein the motion detector includes means to activate the picture taking means or means to activate a light source for lighting a field of vision of the picture taking means.

2. The cooking device of claim 1, wherein the picture taking means comprises an electronic image sensor.

3. The cooking device of claim 1, wherein the picture taking means comprises photo optics having a lens selected from the group consisting of a variable focal length lens, a fixed focal length lens and a prime lens.

4. The cooking device of claim 1, wherein the picture taking means is located outside of the cooking chamber and adjacent the cooking device door at a position above or laterally above the door of the cooking chamber.

5. The cooking device of claim 1, wherein the picture taking means is mounted on an extendable and retractable holder, wherein the holder extends when the cooking device door is opened and retracts when the cooking device door is closed.

6. The cooking device of claim 1, wherein a second picture taking means is provided.

7. The cooking device of claim 1, wherein the picture taking means avoids the effect of an upward path of hot vapor escaping from the cooking chamber when the door is opened by methods selected from the group consisting of providing the picture taking means with optics covered by a glass cover, providing the picture taking means with optics coated with a de-mister coating, positioning the picture taking means outside of the path of hot vapor, providing an air blower for directing the vapor away from or around the taking means, and combinations of the foregoing.

8. The cooking device of claim 1, wherein the picture taking means is oriented with a central capture area axis within a plane parallel to the front side of the cooking device, or with an angle versus that plane towards the front side.

9. The cooking device of claim 1, wherein the controller performs the further steps of:

checking whether current cooking chamber conditions are suitable for cooking identified food to be cooked; and issuing a warning if current cooking chamber conditions are not suitable.

10. The cooking device of claim 1, wherein the controller performs the further step of:

issuing a warning upon a failed attempt to identify the food to be cooked.

11. The cooking device of claim 1, wherein controller performs the further step of:

starting the cooking recipe automatically when the cooking device door is closed.

12. The cooking device of claim 1, wherein the cooking recipe is started upon actuating a cooking start command element.

13. The cooking device of claim 12, wherein the controller performs the further step of:

providing a plurality of cooking recipes for manual selection.

14. The cooking device of claim 1, wherein the controller has a learning capability for identifying food to be cooked comprising the steps of:

obtaining one or more images from the picture taking means of food to be cooked that is unknown to the controller;

accepting an identification associated with the unknown food to be cooked; and accepting a cooking recipe associated with the unknown food to be cooked.

15. The cooking device of claim 1, wherein the light source comprises an infrared light source.

16. A cooking device for commercial use comprising:

a cooking chamber;

a door for providing access to the cooking chamber; and a digital optical identification means for identifying a food to be cooked within the cooking device, wherein the digital optical identification means comprises:

a physical feature data base of stored physical data of previously presented food to be cooked;

physical feature data collection means for the food to be cooked, wherein the physical feature data collection means consists of picture taking means, and wherein the picture taking means captures images of the food to be cooked; and a controller, wherein the controller performs the steps of:

accessing the captured images of the food to be cooked taken by the picture taking means;

accessing the physical feature data base of stored physical data of previously presented food to be cooked;

accessing a data base of cooking recipes for food to be cooked;

comparing calculated data from the captured images of the food to be cooked to the stored physical data of previously presented food to be cooked;

identifying the food to be cooked based upon the comparison;

loading a cooking recipe for the identified food to be cooked into the cooking device.

* * * * *